United States Patent [19]

Plus

[11] Patent Number: 5,058,995
[45] Date of Patent: Oct. 22, 1991

[54] PIXEL ELECTRODE STRUCTURE FOR LIQUID CRYSTAL DISPLAY DEVICES

[75] Inventor: Dora Plus, S. Bound Brook, N.J.

[73] Assignee: Thomson Consumer Electronics, Inc., Indianapolis, Ind.

[21] Appl. No.: 493,604

[22] Filed: Mar. 15, 1990

[51] Int. Cl.$^5$ .............................................. G02F 1/13
[52] U.S. Cl. ...................................... 359/59; 357/4; 357/23.7; 359/87
[58] Field of Search ............... 350/332, 334, 336, 333; 357/2, 4, 23.7

[56] References Cited

U.S. PATENT DOCUMENTS

| | | | |
|---|---|---|---|
| 4,686,553 | 8/1987 | Possin | 357/23.7 |
| 4,705,358 | 11/1987 | Yamazaki et al. | 350/334 |
| 4,720,736 | 1/1988 | Takafuji et al. | 357/23.7 |
| 4,857,907 | 8/1989 | Koden | 340/784 |
| 4,862,234 | 8/1989 | Koden | 357/23.7 |
| 4,889,411 | 12/1989 | Parks et al. | 350/334 |
| 4,961,629 | 10/1990 | Kato | 350/332 |

FOREIGN PATENT DOCUMENTS 0090661 10/1983 European Pat. Off. ............ 350/334

*Primary Examiner*—Rolf Hille
*Assistant Examiner*—Tan Ho
*Attorney, Agent, or Firm*—J. S. Tripoli; D. H. Irlbeck; L. L. Hallacher

[57] ABSTRACT

A liquid crystal pixel electrode and a thin film transistor (TFT) structure includes a select line, a portion of which is coated with undoped solid state material. The select line is parallel to a continuous uninterrupted side of the pixel electrode and a data line is parallel to another continuous uninterrupted side of the pixel electrode. A source area and a drain area of doped solid state material are placed over the undoped layer. The source area contacts the data line and the drain area contacts the pixel electrode. The select line also serves as the gate electrode of the TFT. A notch passes through the undoped material between the data line and the drain to prevent leakage.

14 Claims, 3 Drawing Sheets

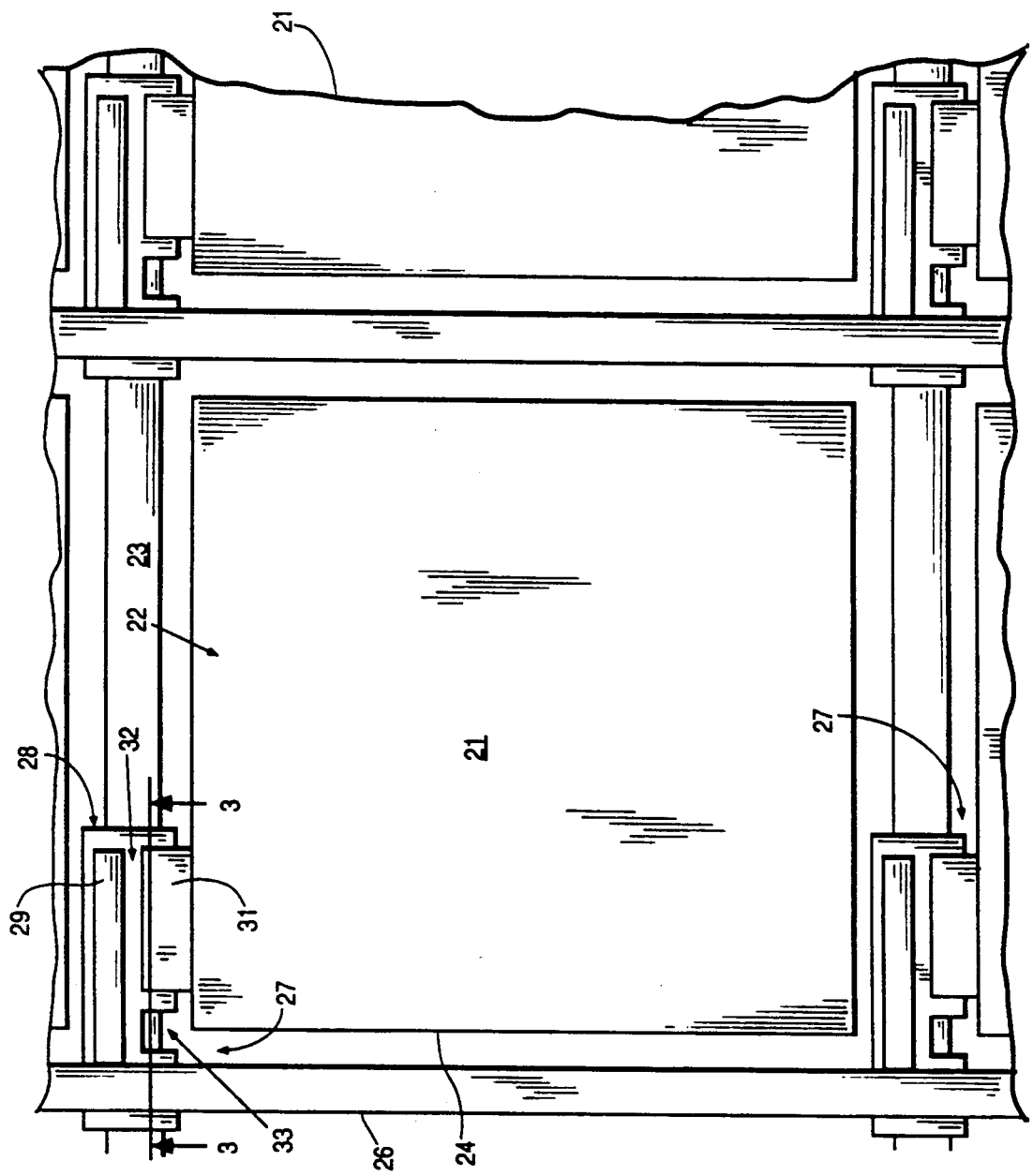

PIXEL ELECTRODE STRUCTURE FOR LIQUID CRYSTAL DISPLAY DEVICES

BACKGROUND

This invention relates generally to liquid crystal display devices and particularly to a pixel electrode structure for such devices.

Liquid crystal display devices are composed of a matrix of pixels arranged horizontally in rows and vertically in columns. The individual liquid crystals are defined by transparent electrodes which determine the configuration of the liquid crystal cell. In active matrix liquid crystal displays, each liquid crystal cell is associated with a thin film transistor (TFT), or other solid state switching device, which serves as a switch to selectively turn the liquid crystals on and off. Select lines run horizontally between the rows of pixel electrodes and the gates of the TFTs are coupled to the select lines. Accordingly, a complete horizontal row of pixel electrodes is simultaneously "turned on" upon the selection of a particular select line. Data lines run vertically between the columns of pixel electrodes and are used to apply the display producing data signals to the pixel electrodes of a particular column. However only the pixels which are associated with energized TFTs receive the data signals. The display is therefore produced one line at a time. Typically, the source of the TFT is electrically coupled to the drive line and the drain of the TFT is coupled to the pixel electrode.

In the prior art, space for the TFTs is provided by removing a corner of the pixel electrodes and fabricating the TFTs in the vacated areas. This is disadvantageous because the pixel electrodes are transparent to light while the TFTs are not. Accordingly, the corner of the pixel electrode which is removed to provide space for the TFTs is no longer transparent to light and the amount of light passing through the electrode is decreased by the same percentage as the percentage of decrease in the area of the electrode.

For this reason there is a need for a liquid crystal pixel electrode and TFT structure which maximizes the area for light transmission in a liquid crystal display. The present invention fulfills this need.

SUMMARY

A liquid crystal pixel electrode structure includes a select line supported on a substrate and coated with an insulative material. A region of undoped solid state material overlays a length of the select line. A source area of doped solid state material overlays a first portion of the region and extends beyond the select line. A drain area of doped solid state material overlays a second portion of the region and is spaced from the source area to form a channel between the source and drain areas. A data line is in electrical contact with the source area and extends substantially perpendicular to the select line. A pixel electrode having a first continuous uninterrupted side is in electrical contact with the drain area and also has a second continuous, uninterrupted side spaced from the data line. A notch passes through the undoped solid state material and is positioned between the data line and the drain area to prevent leakage between the source area/data line and the drain area.

BRIEF DESCRIPTION OF THE DRAWINGS

FIG. 2 is a preferred embodiment of the present invention.

DETAILED DESCRIPTION

Figure 1:
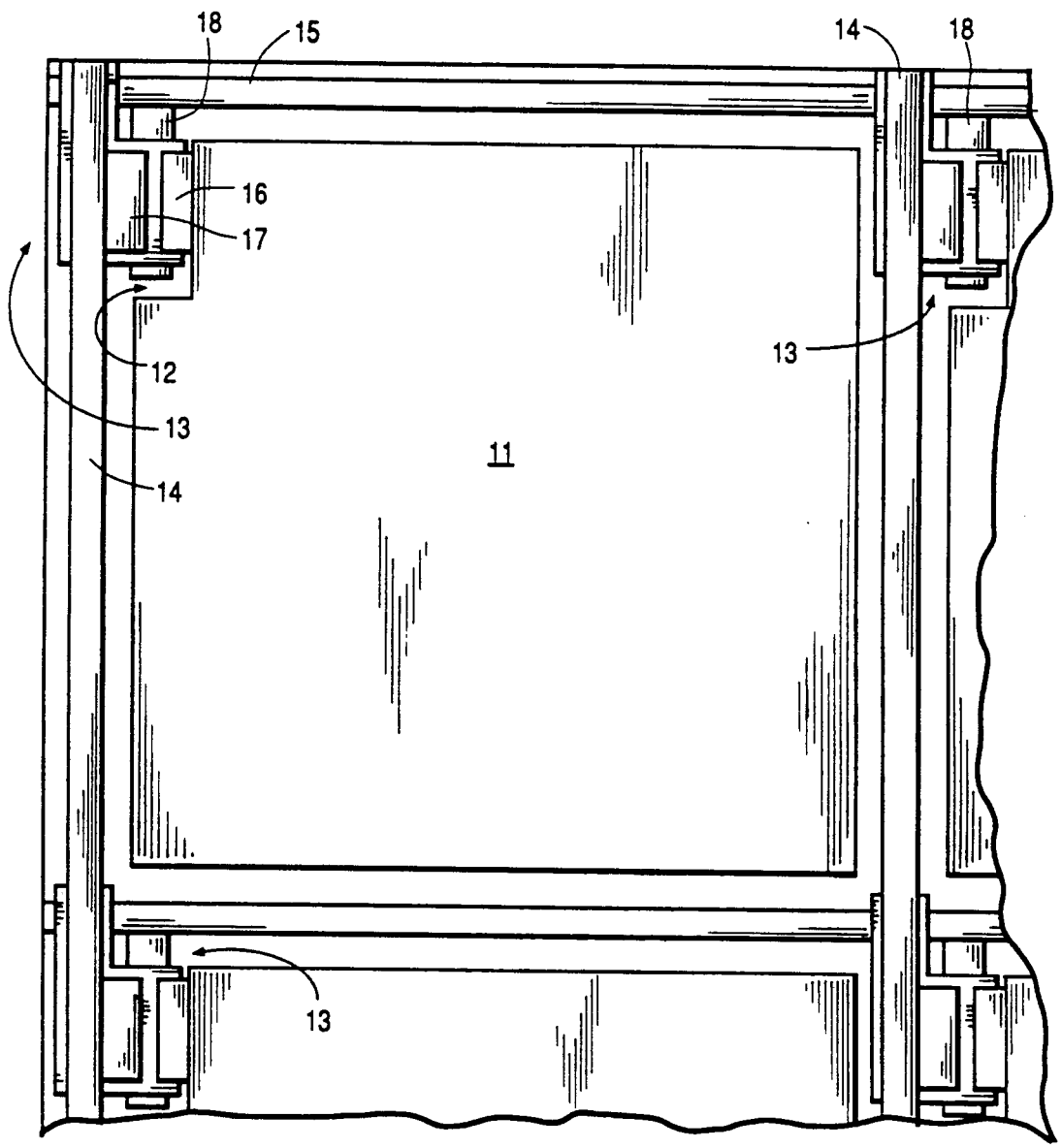
FIG. 1 shows a prior art pixel electrode and thin film transistor structure.

FIG. 1 is a prior art arrangement of a thin film transistor (TFT) for connecting the pixel electrode of a liquid crystal device to the select line and data lines of the device. In FIG. 1, a pixel electrode 11 has a corner 12 removed to provide space for a thin film transistor (TFT) 13 which couples the pixel electrode 11 to a data line 14 and a select line 15. The TFT 13 includes a drain 16 which is in electrical contact with the pixel electrode 11. The TFT also includes a source 17 which is in electrical contact with the drive line 14. The gate 18 of the TFT 13 is an electrical contact with the select line 15. Additional TFTs 13 are shown for adjacent pixel electrodes, only portions of which are shown.

In operation, the select line 15 is voltage biased to apply a voltage to the gates 18 of the TFTs 13 thereby turning on all of the TFTs which are electrically connected to the biased select line. The video signals which are to be imposed upon the pixel electrodes 11 are applied by the various data lines 14 to charge the liquid crystal devices to the voltages needed to produce the desired display. When the voltage is applied to the pixel electrodes 11 the liquid crystal material molecules realign and the liquid crystal material becomes light transparent. Accordingly, light from a backlighting system (not shown) passes through the material and the pixel electrode 11 to generate the desired visual display. When a color display is to be produced the pixel electrodes 11 are associated with filters of the three primary colors of red, green and blue so that all colors, including fleshtones, can be produced. The light passes through the pixel electrodes 11 and therefore the intensity, or brightness, of the display is a function of the area of the pixel electrodes. However, because the corners 12 of the pixel electrodes are removed to provide room for the opaque TFTs, the area of the pixel electrodes is reduced and the brightness of the display is proportionally reduced. Another disadvantage of the prior art system is the need for a separate gate electrode for the TFTs 13, this need increases the space required for the TFTs and also decreases the manufacturing yield because it constitutes another element which can short circuit or open during fabrication.

Figure 1A:
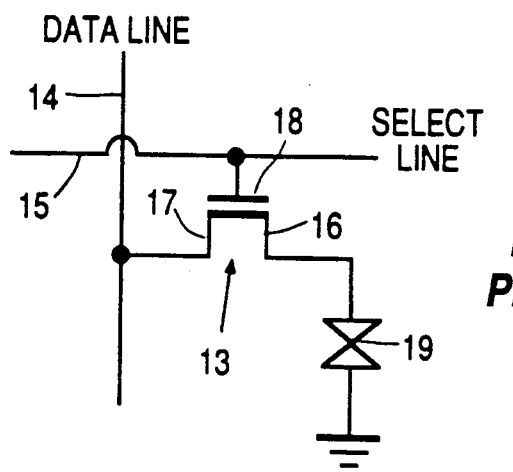
FIG. 1a is an equivalent circuit of the structure of FIG. 1.

FIG. 1a is an equivalent circuit of the TFT arrangement of FIG. 1. A liquid crystal cell 19 is coupled between the drain 16 of TFT 13 and a ground plane which is common to all the liquid crystal elements within the display. When the select line 15 is energized with a select voltage the gates 18 of all the TFTs coupled to the energized line are actuated and the TFTs are turned on for the entire line. The source 17 of TFT 13 is coupled to data line 14 and applies the display producing data signals to cell 19 through TFT 13. The configuration of the pixel electrode 11 determines the configuration of the liquid crystal element 19 and typically is identical for all the pixel elements within the display, particularly when the display is used for color television.

In the preferred embodiment of FIG. 2 the pixel electrode 21 has a first substantially straight continuous uninterrupted side 22 which is substantially parallel to a select line 23. Pixel electrode 21 also has a second substantially straight continuous uninterrupted side 24 which is substantially parallel to a drive line 26. Thus, none of the area of the pixel electrode 21 is sacrificed to make space for TFTs. TFTs 27 are formed by applying a region 28 of undoped solid state material, which preferably is amorphous silicon or polysilicon, over a length of the select line 23. A source area 29 of doped solid state material, which preferably is amorphous silicon but can be polysilicon, is arranged over a portion of the undoped region 28 and in contact with the data line 26. A drain area 31 of doped solid state material, which also can be amorphous silicon or polysilicon, overlies another portion of the undoped region 28 and is in electrical contact with the pixel electrode 21. Source area 29 and drain area 31 are spaced apart to form a channel 32. A notch 33 is formed through the undoped solid state material between the drive line 26 and the drain area 31 to prevent current leakage between the source area/data line 26 and the drain 31.

Figure 2A:
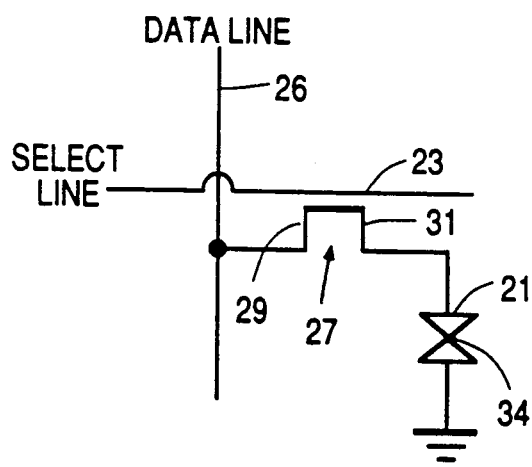
FIG. 2a is an equivalent circuit of the preferred embodiment of FIG. 2.

FIG. 2a is an equivalent circuit of the structure of FIG. 2. The TFT 27 has the drain 31 coupled to the pixel electrode 21 of the liquid crystal device 34. The select line 23 serves as the gate electrode for the TFT 27 thereby simplifying the manufacturing process and permitting elimination of the notched corners 12 of the prior art embodiment shown in FIG. 1. The source 29 is connected to the data line 26.

Figure 3:
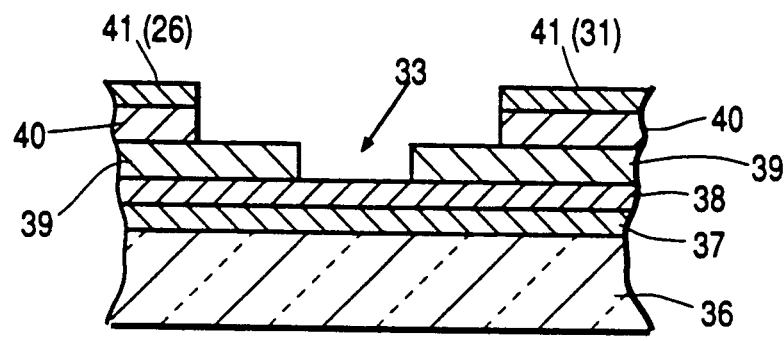
FIG. 3 is a cross section taken on line 3—3 of FIG. 2.

FIG. 3 is a cross section taken along line 3—3 of FIG. 2. A transparent substrate 36 provides support for the structure. Liquid crystal material and another substrate, which are not shown, would be arranged above the substrate 36, and a backlighting unit, also not shown, would be arranged beneath the substrate 36, as is known to those skilled in the art. A first layer 37 is applied to the substrate 36 and is etched or otherwise partially removed, to form the select lines 23. The layer 37 therefore is electrically conductive and preferably can be titanium, for example. An insulative layer 38 is applied over the entire substrate to electrically isolate the select lines 23 from the other components of the device. An undoped layer 39 of solid state material is placed over the insulator layer 38, preferably the layer 39 is undoped amorphous silicon; however polysilicon also can be used. A layer 40, of n+ doped amorphous silicon (or polysilicon) is placed over the layer 39. The layers 39 and 40 are shaped to form the region 28 upon which the source area 29 and drain area 31 are partially formed. A molybdenum layer 41 is placed over the doped layer 40 and formed into the data lines 26. The molybdenum layer is also used as a mask to reshape the n+ layer 40. A transparent conductive layer ITO (idium tin oxide, not shown) is placed over the entire element and selected portions of the ITO are removed to form the pixel electrodes 21 and to remove the ITO from contact with all portions of the TFT except the drain area 31. If desired a final insulating layer can be applied over the entire device to provide electrical isolation to prevent shorts.

What is claimed is:

1. A liquid crystal pixel electrode structure comprising:
   an insulative substrate;
   a select line supported on said substrate;
   an insulative material coating said select line;
   a region of undoped solid state material on said insulative material coating and overlaying a length of said select line;
   a source area of doped solid state material overlaying a first portion of said region and extending beyond said select line;
   a drain area of doped solid state material overlaying a second portion of said region and spaced from said source area to form a channel between said source and drain areas;
   a data line in electrical contact with said source area and extending substantially perpendicular to said select line;
   a pixel electrode having a first continuous uniterrupted side in electrical contact with said drain area and having a second continuous uninterrupted side spaced from said data line; and
   a notch passing through said doped and undoped solid state material and positioned between said data line and said drain area for preventing leakage between said data line and said drain area.

2. The pixel electrode structure of claim 1 wherein said undoped solid state material is amorphous silicon.

3. The pixel electrode structure of claim 2 wherein said doped solid state material is amorphous silicon.

4. The pixel electrode structure of claim 1 wherein said doped solid state material is amorphous silicon.

5. The pixel electrode structure of claim 1 wherein said undoped solid state material is polysilicon.

6. The pixel electrode structure of claim 2 wherein said doped solid state material is polysilicon.

7. The pixel electrode structure of claim 1 wherein said doped solid state material is polysilicon.

8. A thin film transistor (TFT) and pixel electrode structure for a liquid crystal display comprising:
   an insulative substrate;
   a common select line and TFT gate electrode supported on said substrate;
   an insulative coating on said select line and gate electrode;
   a region of undoped solid state material on said insulative coating and overlaying a length of said select line and gate electrode;
   a source for said TFT comprised of doped solid state material overlaying a first portion of said region and extending beyond said select line;
   a drain for said TFT comprised of doped solid state material overlaying a second portion of said region and spaced from said source to form a channel between said source and said drain;
   a data line in electrical contact with said source and extending substantially perpendicular to said select line;
   a pixel electrode having a first continuous uninterrupted side in electrical contact with said drain and having a second continuous uninterrupted side spaced from said data line; and
   a notch passing through said undoped solid state material and positioned between said data line and said drain for preventing leakage between said data line and said drain.

9. The pixel electrode structure of claim 8 wherein said undoped solid state material is amorphous silicon.

10. The pixel electrode structure of claim 9 wherein said doped solid state material is amorphous silicon.

11. The pixel electrode structure of claim 8 wherein said doped solid state material is amorphous silicon.

12. The pixel electrode structure of claim 8 wherein said undoped solid state material is polysilicon.

13. The pixel electrode structure of claim 12 wherein said doped solid state material is polysilicon.

14. The pixel electrode structure of claim 8 wherein said doped solid state material is polysilicon.

* * * * *